United States Patent [19]

Schweiger

[11] 4,113,559
[45] Sep. 12, 1978

[54] METHOD OF REMOVING THE DECAY HEAT OF RADIOACTIVE FISSION PRODUCTS

[75] Inventor: Fritz Schweiger, Germany

[73] Assignee: Hochtemperatur-Kernkraftwerk GmbH (HKG) Gemeinsames Europaisches Unternehmen, Uentrop/Unna, Germany

[21] Appl. No.: 674,483

[22] Filed: Apr. 7, 1976

[30] Foreign Application Priority Data

Apr. 12, 1975 [DE] Fed. Rep. of Germany ....... 2516123

[51] Int. Cl.² ............................................ G21C 9/00
[52] U.S. Cl. ................................. 176/38; 176/58 PB
[58] Field of Search .................... 176/38, 37, 58 PB

[56] References Cited

U.S. PATENT DOCUMENTS

| | | | |
|---|---|---|---|
| 2,735,811 | 2/1956 | Weinberg et al. | 204/193 |
| 3,431,168 | 3/1969 | Kjemtrup | 176/55 |
| 3,475,272 | 10/1969 | Fortescue et al. | 176/38 |
| 3,660,231 | 5/1972 | Fox et al. | 176/56 |
| 3,691,084 | 9/1972 | Zittel et al. | 252/182 |
| 3,859,166 | 1/1975 | Flynn et al. | 176/38 |

FOREIGN PATENT DOCUMENTS 1,195,166  6/1970  United Kingdom ...................... 176/37

OTHER PUBLICATIONS

Brown et al., "HGK 300 MWe Nucl. Power Plant Ventrop with THTR in the View Power Station Westfalen," pp. 1–74.

Primary Examiner—Samuel W. Engle
Assistant Examiner—Ralph Palo
Attorney, Agent, or Firm—Toren, McGeady and Stanger

[57] ABSTRACT

A method of removing the decay heat of radioactive fission products from a gas-cooled high temperature nuclear reactor in an emergency situation wherein a fault or a combination of faults results in the normal operational systems of the reactor not being able to remove the decay heat satisfactorily, comprises introducing water into the reactor core. Preferably the water is completely desalinated water which is introduced into the core from above. Absorber material may also be mixed with the water before it is introduced into the core to effect permanent shutdown of the reactor by absorbing free neutrons within the core.

12 Claims, 1 Drawing Figure

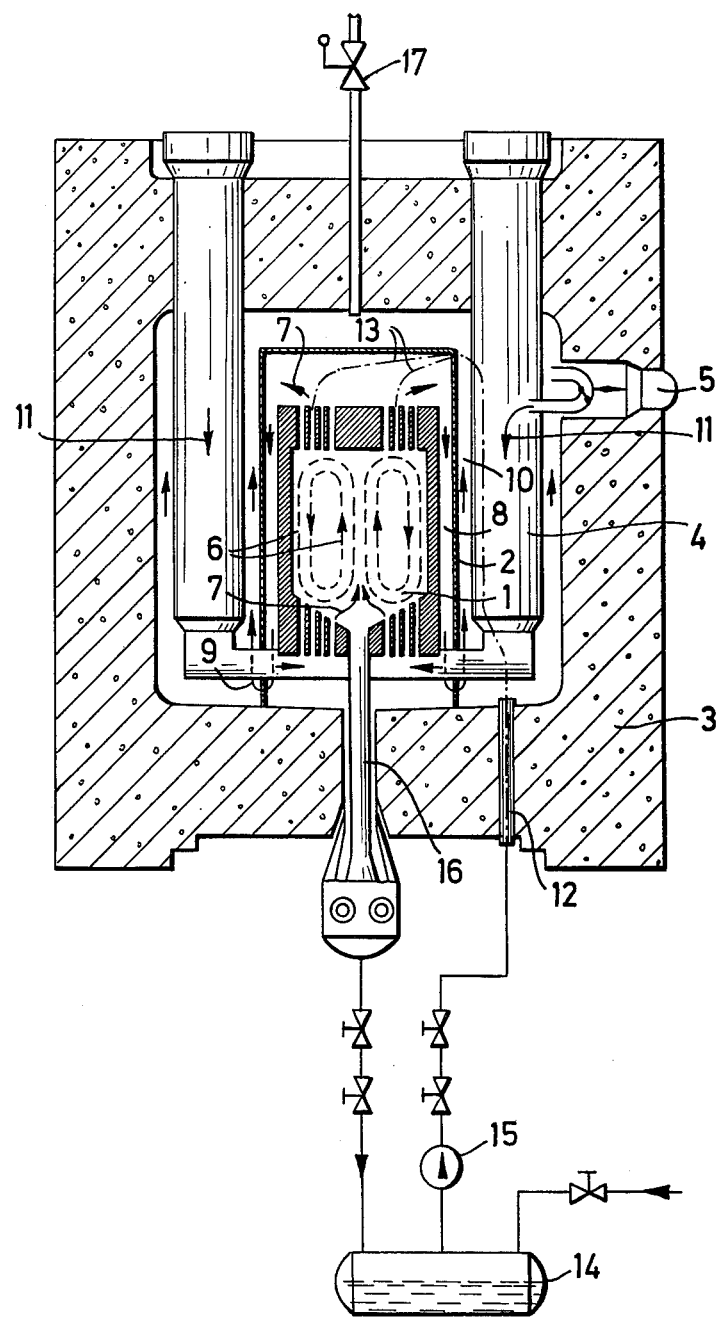

METHOD OF REMOVING THE DECAY HEAT OF RADIOACTIVE FISSION PRODUCTS

This invention relates to a method of removing the decay heat of radioactive fission products in gas-cooled high temperature nuclear reactors in special fault cases and, in particular in helium-cooled high temperature nuclear reactors.

During the operation of nuclear reactors, radioactive fission products are produced, which generate heat as a result of their radioactive decay. Whilst the reactor is in operation, it is not usually necessary to distinguish between the heat produced by nuclear fissions and the decay heat arising from the radioactive decay of the fission products.

The decay heat in the power generated by the reactor must be considered separately however when a shut-down situation arises for the reactor. After a reactor has been shut down, that is when the power originating from the nuclear fissions is reduced to zero in correspondence with the neutron flux only the proportion of power arising from the decay heat still remains. This proportion is small, amounting immediately after the shutdown in the reactor types under discussion here to about 6% of the power previously generated. The decay heat then reduces within five minutes to approximately one half this value and, after thirty minutes to less than ⅓ of its initial value. Nevertheless the decay heat presents considerable complications with regard to the safety measures which must be taken.

If it was practically possible to design all reactors so that, after shutdown, the heat loss through the reactor vessel was so large that the decay heat could flow away without producing unacceptably high temperatures of the reactor vessel or of the components inside the vessel, then the decay heat would not constitute any problem. Such a design is not possible in practice however. In gas-cooled, high temperature nuclear reactors, this condition can only be fulfilled if the average power density in the reactor is chosen to be so small as to render the operation of the reactor uneconomic.

In this connection, it must be pointed out however that in the publication Jul-1112-RG October 1974, referring to the example of the so-called PR-500 process heat reactor having spherical fuel elements, it was stated that for a mean power density of 5 MW/m$^3$ in the reactor core, the decay heat can flow away through the three steam generators provided in that example by forced circulation of the cooling gas and without the temperature of the reactor rising to such a great extent that it led to over-stressing. This is a surprising result and one not to be generalised, especially because a so-called OTTO cycle (once through then out) was used, and consequently the core in the vicinity of the surface had a maximum local power density of 17 MW/m$^3$ and, in the vicinity of the core bottom, only 0.5 MW/m$^3$. Thus this reactor has a very variable power distribution. It must however be emphatically pointed out that as an essential prerequisite for the automatic removal of the decay heat expected in this example, the full static coolant gas pressure must be present in the reactor and that the three steam generators are supplied with water, so that a natural convection of the cooling gas becomes established. Indeed it must be added that such a behaviour of this reactor discussed in the publication considerably increases its safety, but nevertheless further measures still have to be taken for the situation where, due to some error or external influence, the coolant gas pressure falls, for example by the escape of the coolant gas, and/or the supply to the coolant gas blowers fails, and/or the supply of feed water to the steam generators no longer takes place.

The probability of such a combination of faults occurring is indeed small, but as will be readily appreciated, must nevertheless be allowed for in the design of nuclear reactors having regard to their safety devices. For symmetrical temperature-and-power-loading of reactors, for the housing of the various reactor components such as blowers and steam generators in the reactor pressure vessel, and also for availability of electricity generation, more than one or two heat exchanger and blower units are usually provided. For example three units are provided in the PR-500 reactor referred to and six units each in the so-called HTR-1,160 and THTR-300. The probability that a coolant gas loss with a drop in its pressure to atmospheric pressure will occur in a gas-cooled reactor is considered to be very low indeed, but it cannot be neglected. Such a fault case may not be regarded as dangerous, provided that a sufficient cooling capacity is still available on the blower and steam generator side. The probability that, a coolant gas loss takes place with pressure drop to atmospheric pressure and a simultaneous failure of all the blower and steam generating units for removing the decay heat takes place, is very small indeed and much lower than that of the coolant gas loss alone.

However low this probability is, of the simultaneous occurrence of several serious faults, it must be allowed for in the design of the reactor, not least in the interests of publicity. Up till the present this has been achieved by the requirement and provision of further expensive redundant auxiliary installations in addition to the redundancies already present for the above-discussed operational reasons, for example a number of emergency supply units, a number of at least partially bunkered emergency control positions, and measuring and protective devices.

It is true that, with the above-mentioned and other additional measures and installations, the probability that the decay heat cannot be conducted away to a sufficient degree after a fault incident has occurred, can theoretically be kept as low as required. This does however involve an expense in all imaginable directions, such as time, personnel, maintenance, keeping of spares, etc., which is so high that there is a keen interest in solving this problem, by economic and absolutely reliable measures which in themselves are not likely to fail.

According to this invention a method of removing the decay heat of radioactive fission products in a gas-cooled high temperature nuclear reactor in the event of a fault or a combination of faults occurring and it being decided that, in consequence, the normal operational systems of the reactor will not be able to remove the decay heat satisfactorily comprises introducing water into the reactor core. Preferably the water is completely desalinated water.

In view of the fact that, in gas-cooled reactors, the presence of any moisture is normally avoided at all costs in the cooling gas circuit, the humidity normally being kept below 0.5 ppm by volume. The measure of introducing water into a high temperature nuclear reactor having fuel elements of graphite and helium as coolant — a combination which even at very high temperatures cannot lead to any corrosion — is a surprisingly simple solution. It must be emphasised at this point that the method according to this invention is only intended as a catastrophe measure for emergency cooling and cannot be regarded as an operating measure, since after the water has been sprayed in to the reactor, the reactor cannot be operated until a major servicing job is carried out. In the cases where the method is used this does not imply any disadvantage however, since where the measures according to this invention become necessary other devices on the reactor can be presumed to have been destroyed so that the removal of the sprayed-in water from the core will not take any longer than the other repairs that would be necessary to the reactor or its ancillary equipment assuming that the reactor can be repaired at all after such as serious fault case.

The great advantage of the method lies in its absolute certainty in overcoming even the most favourably imaginable combinations of fault cases, and especially in that expensive additional safety measures, such as separate decay heat removal devices, can be dispensed with.

Fundamentally it is immaterial at what point the water is introduced into the core, but it is preferred, not least on account of the temperature gradient which becomes established in the core because of natural convection, to pour the water onto the core from above.

The water is preferably supplied in a metered manner onto the core surface in dependence on the maximum permissible temperature gradients of the components of the core, until a thermal balance is stabilised, that is until equilibrium occurs between decay heat and removed heat, for example through heat losses which are in any case present or removal devices which still remain. Thus the feed of the water is preferably carried out continuously, during the period which amounts to the value for the integral for establishing the energy to be removed.

Partly because of the simplicity of the method according to this invention, the measures to be taken may be carried out within a very brief period of the particular fault case occurring.

Provided that it is possible after the fault, the reactor will normally be shut down before the water is supplied onto the hot core surface. This is normally achieved by reducing the neutron flux by the introduction of absorber rods. If, however, the damage due to external influences is so large that the reactor should or must be shut down permanently, then the introduction of water according to this invention for the purpose of emergency cooling enables the reactor to be permanently shut down by adding absorber material to the water, before it is introduced into the core. The absorber material is preferably in the form of boron compounds, which absorb neutrons and keep the reactor permanently shut down.

The method according to this invention for the introduction of water surprisingly does not result in any temperature shock, which under all circumstances should be avoided during normal operation of a reactor. This is attributable firstly to the fact that the core of a gas-cooled high temperature reactor usually consists of a bed, of spherical elements and even small quantities of water cannot build up and secondly to the fact that when water and hot graphite meet, the so-called Leidenfrost effect occurs. When spherical elements which have been heated under a noble gas to about 1000° C, are immersed in cold water they continue to glow for a surprisingly long time on account of a thermally insulating steam layer which forms between the graphite and the water. So that such an insulating layer, which also forms between the separate water droplets and the hot surface of the fuel elements is not destroyed, the water is preferably supplied, in this invention so that the kinetic energy of the water droplets at the instant in which they meet the surface of the core is at most equal to their gravitational force. This can be achieved simply by absorbing the excess kinetic energy of the water by means of deflector plates or tube guides which are of known type and which slow down the water droplets.

In pebble-bed nuclear reactors operating with a continuous fuel element feed, an especially simple possibility is available for instituting the emergency cooling according to this invention, in that the water is supplied to the core from above through the fuel element conveying tubes which are already present around the periphery of the reactor. Condensed water can then be conducted away downwards, through the spherical fuel element removal tube which likewise is already present, to water-removing pipes which are also provided in case of a leak in the steam generating circuit, and, if required the water may be returned by means of a pump through the above-mentioned fuel element feed tubes back to the core.

The above-mentioned cases indicate that the method according to this invention is suitable for any combination of the most serious fault conditions. This is especially true also for the possibility, recently frequently discussed, of a large rupture produced for example by an aircraft crashing into a reactor. In this case, the blowers for the cooling gas would immediately, but at the latest with the introduction of the water, need to be shut down since otherwise air would flow in from outside and the pebble bed would begin to burn, the steam produced by the introduction of water however prevents the entry of air.

To illustrate the numerous possibilities of use of the method according to this invention, a fault case for the THTR-300 type of reactor will be used and it will be assumed, that instead of the designed double-walled closures for the steam generators, only single walled closures are provided, and one of these is destroyed so that the entire coolant gas has flowed out until the pressure is atmospheric and there is no steam generator available for removal of decay heat. In this case, the introduction of water should be started immediately, it being further presumed that the steam formed mainly flows out through the opening in the wall of the steam generator and only a small amount of water condenses in the core after it has diffused through the internal insulation of the reactor pressure vessel. All other reactor components are presumed to be at a temperature of at least 260° C, that is the cold gas temperature under normal operation.

A further fault case will be discussed in which it will be assumed that the coolant gas pressure still possesses its operating value, therefore the primary cooling-gas system is leak tight, but no steam generator is available for the removal of the decay heat. In this fault case also, water will be supplied onto the core surface, but a safety valve is provided, through which not only can blowdown be carried out when excess pressure occurs, but also the pressure can, if desired, be lowered to below the operational value to remove heat from the reactor pressure vessel, if the temperature readings of the steel components indicate that their thermal loading as a result of their being heated up by the super-heated steam is too high. The additional measures of reducing the pressure to below the operational value can be avoided in new designs by so designing the metal components that heating up due to super-heated steam remains within the acceptable range.

As already mentioned, the measure proposed by the invention for the emergency case does not have to result in the final shutdown of the reactor; depending upon the particular combination of faults, a later further operation and the re-use of at least parts of the devices remains definitely possible. This is especially true for the spherical fuel elements, since even under the most favourable assumption that the quantity of heat to be removed from a fuel element after the introduction of the water were to be consumed solely by a water-gas reaction - the graphite burn-up of the element would amount to only 7% of its weight, further secondary reactions can be neglected because the primary circuit is no longer subjected to circulation after commencement of introduction of water. The resultant reduction in diameter of the fuel elements definitely permits a further re-use of the elements. The other graphite components do not undergo any measurable corrosion.

Since the water-gas reaction will take place only on about 25% of all the spherical fuel elements, whereas the water will evaporate on the major part, namely 80% of the spherical elements, the introduction of the water is thus accompanied by an inherently reliable measure, in that a relatively large quantity of steam will always be present in the reactor vessel, so that the mixture of the atmosphere in the reactor consisting of residues of helium, steam, hydrogen and carbon monoxide even after a possible ingress of air, is unlikely to be combustible.

These particular examples of methods in accordance with this invention will be described with reference to the accompanying drawing which diagramatically illustrates the construction of the Thorium High Temperature Reactor (THTR-300) together with its ancillary equipment.

The reactor core 1 consists of a bed of spherical fuel elements situated in a cylindrical vessel. This vessel has a side wall constructed of graphite blocks, which serves as a neutron reflector and surrounds all sides of the reactor core. All the graphite and carbon block components are erected on a steel plate, which together with a steel wall surrounding the graphite side wall and a cover plate constitutes a thermal shield 2, which prevents gamma radiation leaving the reactor.

The reactor core and the other devices essential for the primary circuit are surrounded by a pressure vessel 3, which is constructed as a prestressed concrete vessel. Inside this, as the essential constituents of the primary circuit, are the steam generators 4 and cooling gas blowers 5.

The coolant gas circulation is represented in the drawing by arrows and is indicated correctly for the case in which the blowers 5 are shut down so that a natural circulation resulting from convection is established. A distinction can be made here between an inner and an outer natural circulation. The inner natural circulation, which becomes established in the reactor core on account of the temperature gradient present there, is indicated by the arrows 6. Superimposed upon this is the outer natural circulation, in which the gas flows, in the reverse direction, compared to the operating state, upwards through the graphite components and the core in the direction of arrows 7. The gas then flows downwards in the annular gap 8 formed between the thermal shield 2 and the graphite reflector, is deflected according to arrow 9, ascends in the annular gap 10 between the prestressed concrete vessel 3 and the thermal shield 2 and then passes via the blowers 5 as shown by arrows 11 into the steam generators 4, from which it returns to the core at 7 from below.

The quantity of water, which is required in the THTR-300 having a nominal thermal rating of 750 MW for the emergency cooling according to this invention, can be determined in the following way. 10 hours after shutdown, the integral of the decay heat is about 88 MWh after previous operation under full load for one year. From this, about 20MWh can be deducted for the heat flow into the cooling system of the reactor pressure vessel, so that about 68 MWh has to be removed by the water which is added. If it is further required that the mean core temperature, which under full load is 620° C, shall be reduced to 500° C, then a further 8MWh needs to be removed from the storage capacity of the core as heat stored in the core, giving a total of 76MWh. To hold ready sufficient quantities of completely desalinated water, it should be assumed in the most favourable case that the entire heat must be removed solely by the evaporation of the water introduced. Therefore a maximum of 110 metric tonnes at 50° C should be kept ready, which is no problem for a normal power station. The infeed of the water takes place continuously during the ten hours taken as a basis for the integral of the decay heat, in accordance with the temperature pattern on the components. The volume of the required quantities of water is moreover small by comparison with the geometrically free core volume, which in this case is approximately 2500 m$^3$. Thus initially, the storage capacity of the core if necessary permits the failure of the circulation of the primary cooling circuit, so that sufficient time remains for deciding upon and initiating the necessary measures, without a harmful temperature loading occurring for the core and other reactor components immediately following the shutdown operation. With regard to the storage capacity, for the THTR-300 in the most favourable case, that is after a prior infinitely long full load run, the integral of the decay heat over one hour amounts to about 15 MWh, which would result in an increase in the mean temperature of about 230° C. Here, for reasons of simplicity, the non-relevant most unfavourable assumption has been adopted, that during the entire hour the heat remains inside the pebble bed and there is no flow of heat out into the reflector, into the other reactor components and into the cooling circuit of the reactor pressure vessel. Together with the mean temperature in the core at the instant of shutdown, at a value of about 620° C, the temperature one hour after shutdown, without any heat removal by the blowers or by the addition of water during this period, will in any case be less than 850° C and thus still acceptable.

The storage capacity of the core, in conjunction with the convection circulations described, offers the possibility in specific fault combinations of bridging a certain period of time from the start of the emergency condition in which to prepare and initiate the necessary emergency measures. Amongst other things, a decision must be made about the rate for metering the feed of water. The feed devices should be constructed as simply as possible to prevent any possibility of failure. In a reactor operating with circulating fuel spheres, as in this example, devices which are already present can be utilised. Thus, for example, fuel element supply tubes 12, which are disposed around the periphery, are immediately suitable as water injection tubes, since they discharge at the preferred delivery position of the water injection namely above the core as ducts 13. The fully desalinated water required can be supplied from a storage vessel, not shown, into an intermediate vessel 14, from which it is pumped by means of a pump 15 via the supply tubes 12 into the ducts 13. Water which has condensed in the core can pass back into the intermediate vessel 14 via an annular space surrounding a spherical element removal pipe 16 which is in any case present, to conduct water away from the core in the event of a leak in the steam generator circuit, and the water is then fed back from the intermediate vessel to the core.

A safety valve 17 is provided in communication with a pipe leading through the wall of the pressure vessel 3 so that when a fault condition exists but the full coolant gas pressure still remains, the safety valve operates to relieve excess pressure generated within the pressure vessel 3 by the formation of steam after the introduction of cooling water into the reactor core. This valve 17 may also be used to reduce the pressure within the vessel 3 by removing part of the atmosphere within the vessel 3, particularly when this includes steam, to reduce the temperature within the vessel by mass transport.

With this example when it is required to shut down the reactor completely approximately 2.5 k g of boric acid ($H_3BO_3$) is sufficient to absorb the neutrons and render the core uncritical but preferably 5.0 k g of boric acid is used to be on the safe side.

Thus this example illustrates that this method is absolutely reliable for use in emergencies and can be carried out with the minimum of expense by means of devices which are very cheap in comparison with the safety devices which have been proposed hitherto.

I claim:

1. A method of removing the decay heat of radioactive fission products from the core of a helium-cooled graphite-moderated high temperature nuclear reactor using pebble type fuel elements after the fission reaction has been shut down and in an emergency situation wherein a fault or a combination of faults results in the inability of the normal operational systems of the reactor to remove the decay heat satisfactorily, comprising introducing water into the core of said reactor into direct surface contact with the pebble type fuel elements.

2. The method of claim 1, wherein said water is completely desalinated water.

3. The method of claim 1, wherein supplying said water to said core in a metered manner, in accordance with the maximum temperature gradients permissible in said reactor, until the heat balance is stabilised.

4. The method of claim 1, wherein in the event of said emergency situation being a serious leak in said helium gas-cooling of said reactor, shutting down the helium circulating equipment immediately following shut down.

5. The method of claim 1, wherein directing said water downwardly into said core from above.

6. The method of claim 5, wherein introducing said water into the core so that the kinetic energy of said water at the instant of its impact upon the surface of the pebble type fuel elements is no greater than the kinetic energy arising from its free fall.

7. The method of claim 1, wherein mixing absorber material with said water before its introduction into said core.

8. The method of claim 7, wherein said absorber material is a boron compound.

9. The method of claim 1, wherein said reactor includes a fuel element removal tube, a steam generator and a water removal pipe to remove water in the event of rupture of said steam generator, and wherein collecting water which condenses after its introduction into said core in the bottom of said core and removing said water through said fuel element removal tube and said water removal tube.

10. The method of claim 9, wherein returning said removed condensed water to said core through feed tubes which are arranged to discharge said water above said core.

11. The method of claim 1, wherein in the event of said emergency situation being a failure of all steam generators associated with said reactor and where the full coolant gas pressure still remains, relieving the excess pressure generated by formation of steam from said water introduced into said reactor.

12. The method of claim 11, wherein relieving said pressure to below the operating pressure of said coolant-gas.

* * * * *